(12) United States Patent
Hosomi (10) Patent No.: US 7,835,287 B2
(45) Date of Patent: Nov. 16, 2010

(54) MOBILE STATION, DOWNSTREAM TRANSMISSION RATE CONTROL METHOD, AND DOWNSTREAM TRANSMISSION RATE CONTROL PROGRAM

(75) Inventor: Takahiro Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 12/092,307

(22) PCT Filed: Nov. 14, 2006

(86) PCT No.: PCT/JP2006/322674

§ 371 (c)(1),
(2), (4) Date: May 1, 2008

(87) PCT Pub. No.: WO2007/058178

PCT Pub. Date: May 24, 2007

(65) Prior Publication Data

US 2009/0268616 A1   Oct. 29, 2009

(30) Foreign Application Priority Data

Nov. 21, 2005   (JP)   ............................... 2005-335810

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 3/00* (2006.01)
*H04L 12/26* (2006.01)

(52) U.S. Cl. ........................................ 370/241; 370/229

(58) Field of Classification Search ................ 370/241, 370/358, 252, 468
See application file for complete search history.

(56) References Cited

U.S. PATENT DOCUMENTS

| 2002/0181637 | A1* | 12/2002 | Nakabayashi | ............... 375/358 |
| 2004/0078478 | A1* | 4/2004 | Yahagi | ....................... 709/233 |
| 2006/0079257 | A1* | 4/2006 | Iochi et al. | ................... 455/517 |
| 2008/0123542 | A1* | 5/2008 | Karlsson | ...................... 370/252 |

FOREIGN PATENT DOCUMENTS

| JP | 05020247 A | 1/1993 |
| JP | 2003051781 A | 2/2003 |
| JP | 2004266739 A | 9/2004 |
| JP | 2005159486 A | 6/2005 |

OTHER PUBLICATIONS

International Search Report for PCT/JP2006/322674, mailed Jan. 30, 2007.

* cited by examiner

*Primary Examiner*—Ricky Ngo
*Assistant Examiner*—David Oveissi (57) ABSTRACT

An aspect of the invention provides a mobile station which can restrict an upper limit of a transmission rate according to a processing capacity in processing packet data received from a base station. The mobile station includes packet data retaining means 16 for tentatively retaining packet data received from a base station 100; reject ratio computation means 16 for computing a ratio of rejected packet data in the packet data retained by the packet data retaining means 16; transmission rate setting means 30 for setting an upper limit of a downstream transmission rate based on the ratio computed by the reject ratio computation means 16; and transmission rate notification means 25 for notifying the base station 100 of the upper limit of the transmission rate set by the transmission rate setting means 30.

23 Claims, 7 Drawing Sheets

| PACKET DATA RATE | MAXIMUM CQI VALUE |
|---|---|
| 3. 66Mbbs | 16 |
| 3. 24Mbbs | 16 |
| 3. 00Mbbs | 15 |
| 2. 75Mbbs | 14 |
| 2. 5Mbbs | 13 |
| 2. 0Mbbs | 12 |
| • | • |
| • | • |
| • | • |

F I G. 6

| CPU LOAD CONDITION (LOAD FACTOR) | MAXIMUM CQI VALUE |
|---|---|
| 0% | 16 |
| 10% | 16 |
| 20% | 14 |
| 30% | 12 |
| 40% | 9 |
| ● | ● |
| ● | ● |
| ● | ● |
| ● | ● |

F I G. 7

| OPERATING APPLICATION | MAXIMUM CQI VALUE |
|---|---|
| NOT AVAILABLE | 16 |
| ONLY A | 15 |
| ONLY B | 14 |
| ONLY C | 12 |
| A AND B | 8 |
| A AND C | 7 |
| B AND C | 6 |
| A, B, AND C | 3 |
| ● | ● |

MOBILE STATION, DOWNSTREAM TRANSMISSION RATE CONTROL METHOD, AND DOWNSTREAM TRANSMISSION RATE CONTROL PROGRAM

TECHNICAL FIELD

The present invention relates to a mobile station which enables downstream high-speed packet communication, and downstream transmission rate control method and a downstream transmission rate control program which are performed by the mobile station.

BACKGROUND ART

Conventionally, there is studied a communication method called HSDPA (High Speed Downlink Packet Access) as a high-speed IMT-2000 packet transmission method for the purpose of high-speed downstream peak transmission rate, low transmission delay, and high throughput. There are disclosed transmission methods called AMC (Adaptive Modulation and Coding) as a technique of assisting HSDPA in 3GPP (3rd Generation Partnership Project) TR25.848 "Physical layer aspects of UTRA High Speed Downlink Packet Access, and TR25.858 "HSDPA Physical Layer Aspects".

In HSDPA, one physical channel is shared and used by plural mobile stations by time sharing. Therefore, a base station determines which mobile station should receive information at one point based on line quality.

The AMC technique is used to properly change a modulation method or an error correction coding rate at high speed according to a variation in line quality.

In the AMC technique, as the line quality becomes better, the higher modulation method is adopted, the error correction coding rate is enhanced, and transmission rate is also enhanced.

In the AMC technique, the base station allocates the modulation method and coding rate (MCS: Modulation and Coding Scheme) to each mobile station based on the line quality.

Specifically, the base station measures the downstream line quality, the base station determines the optimum transmission rate based on the measured line quality, and the base station transmits various pieces of information to the mobile station side at the determined transmission rate.

CQI (Channel Quality Indicator) can be cited as an example of the line quality. CQI is information for notifying the base station in communication of the transmission rate receivable on the mobile station side. CQI is determined based on reception quality on the mobile station side.

Figure 1:
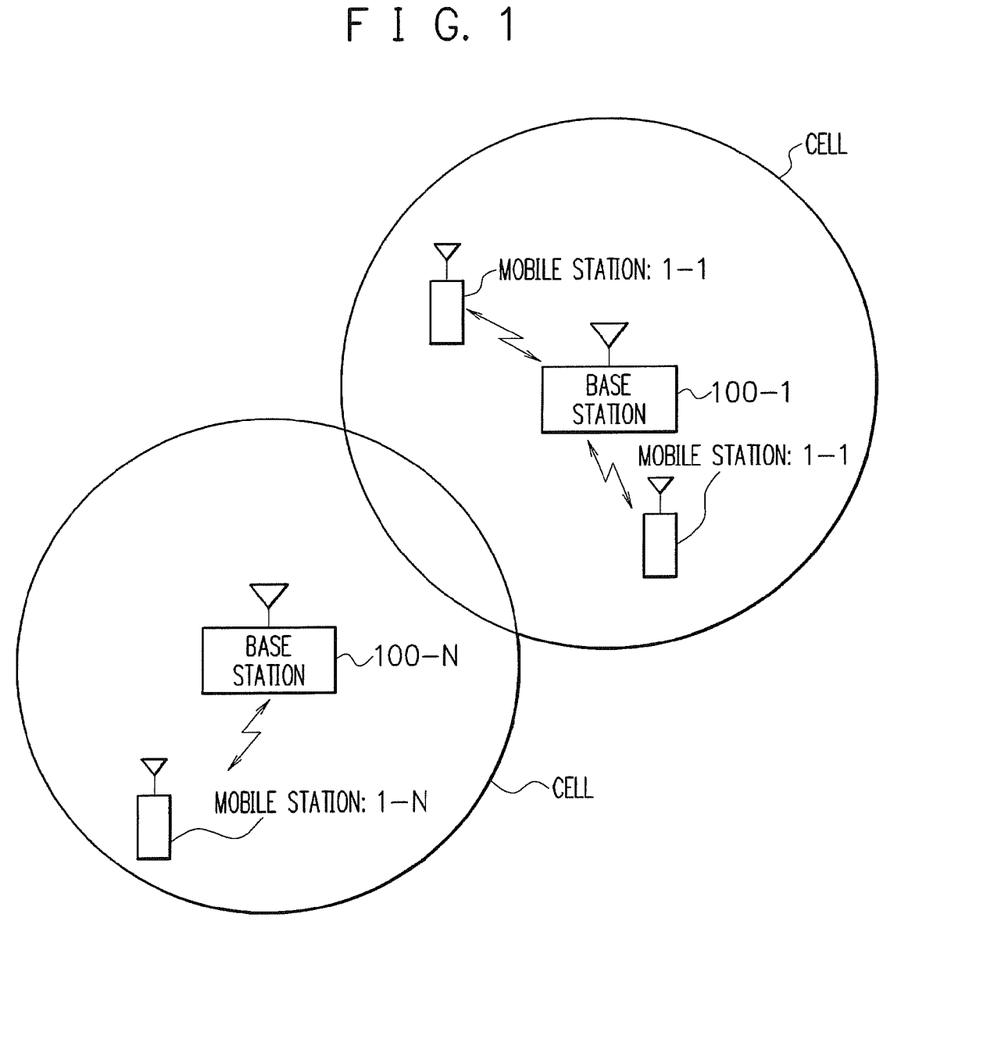
FIG. 1 shows a system configuration of a wireless communication system.

A wireless communication system which enables downstream high-speed packet communication will be described with reference to FIG. 1.

The wireless communication system includes a mobile station (1-1 to 1-N: N is an arbitrary integer) and a base station (100-1 to 100-N: N is an arbitrary integer). The base station (100-1 to 100-N) transmits transmission data (packet data) to the mobile station (1-1 to 1-N) located in a cell.

Figure 2:
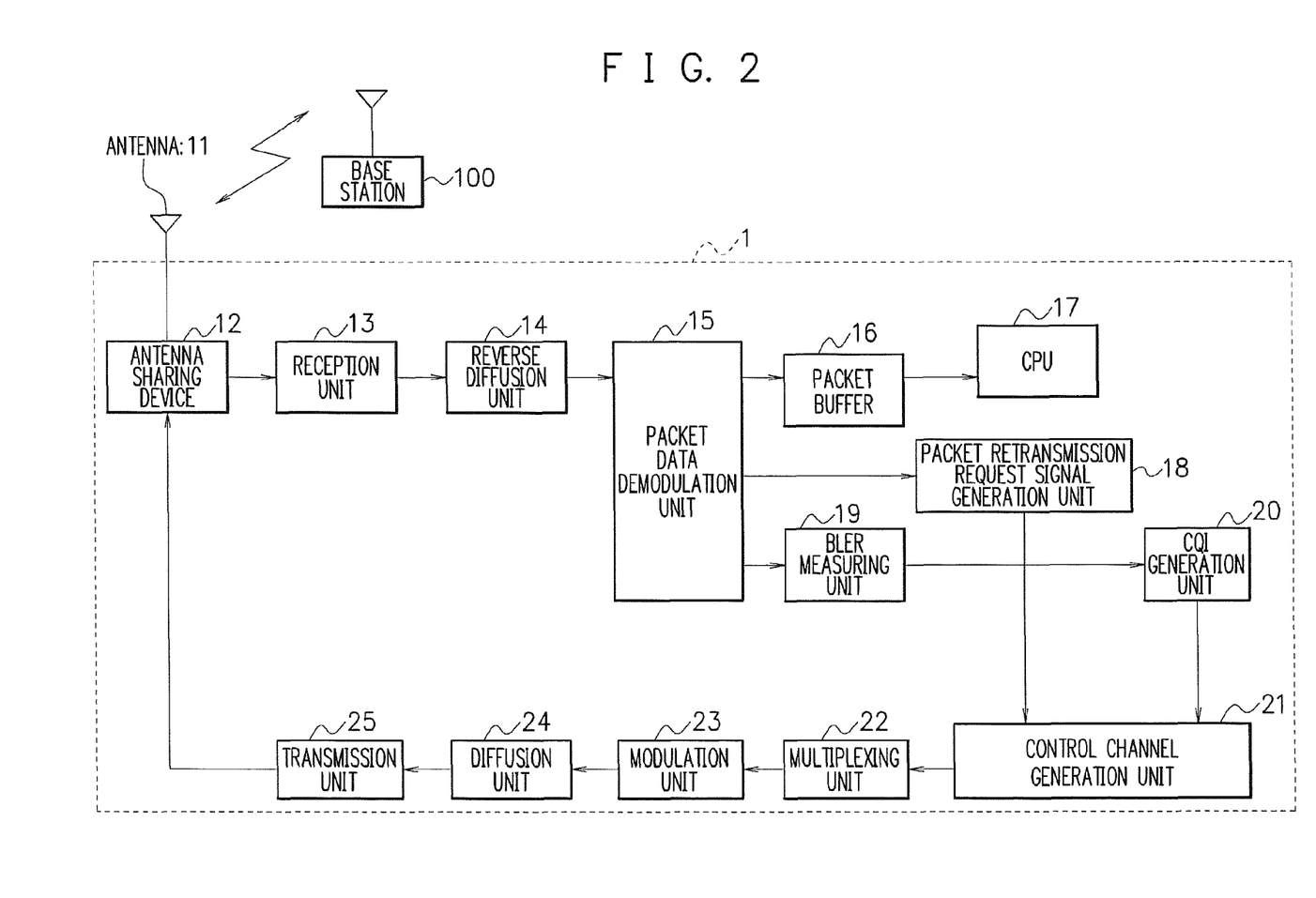
FIG. 2 shows an internal configuration of a mobile station 1 comprising the wireless communication system.

An internal configuration of the mobile stations (1-1 to 1-N) shown in FIG. 1 will be described with reference to FIG. 2.

The mobile stations (1-1 to 1-N) includes an antenna 11, an antenna sharing device 12, a reception unit 13, a reverse diffusion unit 14, a packet data demodulation unit 15, a packet buffer 16, a CPU 17, a packet retransmission request signal generation unit 18, BLER (Block Error Rate) measuring unit 19, CQI (Channel Quality Indicator) generation unit 20, a control channel generation unit 21, a multiplexing unit 22, a modulation unit 23, a diffusion unit 24, and a transmission unit 25.

A series of processing operations in the mobile station (1-1 to 1-N) shown in FIG. 2 will be described.

The mobile station (1-1 to 1-N) receives an RF signal transmitted from the base station (100-1 to 100-N) using the antenna 11, and the mobile station (1-1 to 1-N) outputs the received RF signal to the antenna sharing device 12.

The antenna sharing device 12 outputs the RF signal input from the antenna 11 to the reception unit 13. The reception unit 13 converts the RF signal input from the antenna sharing device 12 into a baseband signal, and the reception unit 13 outputs the converted baseband signal to the reverse diffusion unit 14.

The reverse diffusion unit 14 performs reverse diffusion processing of the baseband signal input from the reception unit 13, and the reverse diffusion unit 14 outputs the reverse diffusion processed data to the packet data demodulation unit 15.

The packet data demodulation unit 15 generates packet data by demodulating the data input from the reverse diffusion unit 14, and the packet data demodulation unit 15 outputs the generated packet data to the packet buffer 16.

The packet buffer 16 tentatively retains the packet data input from the packet data demodulation unit 15, and the packet buffer 16 outputs the tentatively retained packet data to the CPU 17.

The packet data demodulation unit 15 also detects error data based on the packet data, and the packet data demodulation unit 15 outputs packet data identification information for identifying the packet data in which the error data is detected to the packet retransmission request signal generation unit 18.

The packet retransmission request signal generation unit 18 generates packet retransmission request control data based on the packet identification information input from the packet data demodulation unit 15, and the packet retransmission request signal generation unit 18 outputs the generated packet retransmission request control data to the control channel generation unit 21. As used herein, the packet retransmission request control data means control data used to make a packet data retransmission request to the base station (100-1 to 100-N).

The packet data demodulation unit 15 also outputs the error data detected based on the packet data to the BLER measuring unit 19.

The BLER measuring unit 19 measures a BER value based on the error data input from the packet data demodulation unit 15 and an amount of error data, and the BLER measuring unit 19 outputs the measured BER value to the CQI generation unit 20.

The CQI generation unit 20 compares the BER value input from the BLER measuring unit 19 and a predetermined reference value p. When the CQI generation unit 20 determines that the BER value input from the BLER measuring unit 19 is lower than the reference value p (BER value<P), the CQI generation unit 20 sets a CQI value to a level higher than that of the currently-set CQI value, and the CQI generation unit 20 outputs the set CQI value to the control channel generation unit 21. When the CQI generation unit 20 determines that the BER value input from the BLER measuring unit 19 is not lower than the reference value p (BER value$\geq$P), the CQI generation unit 20 sets the CQI value to a level lower than that of the currently-set CQI value, and the CQI generation unit 20 outputs the set CQI value to the control channel generation unit 21.

The control channel generation unit 21 multiplexes the packet retransmission request control data input from the packet retransmission request signal generation unit 18, the CQI value input from the CQI generation unit 20, and other pieces of control data to generate a control channel, and the control channel generation unit 21 outputs the generated control channel to the multiplexing unit 22.

The multiplexing unit 22 multiplexes the control channel input from the control channel generation unit 21 and other channels to generate multiplexed data, and the multiplexing unit 22 outputs the multiplexed data to the modulation unit 23.

The modulation unit 23 generates modulated data by performing modulation processing to the multiplexed data input from the multiplexing unit 22, and the modulation unit 23 outputs the generated modulated data to the diffusion unit 24.

The diffusion unit 24 generates a baseband signal by performing diffusion processing of the modulated data input from the modulation unit 23, and the diffusion unit 24 outputs the generated baseband signal to the transmission unit 25.

The transmission unit 25 generates an RF signal based on the baseband signal input from the diffusion unit 24, and the transmission unit 25 outputs the generated RF signal to the antenna sharing device 12.

The antenna sharing device 12 transmits the RF signal, input from the transmission unit 25, to the base station (100-1 to 100-N) through the antenna 11.

Therefore, the mobile station (1-1 to 1-N) transmits the CQI value set in the CQI generation unit 20 to the side of the base station (100-1 to 100-N), so that the mobile station (1-1 to 1-N) can notify the base station (100-1 to 100-N) of an upper limit of a transmission rate receivable on the side of the mobile station (1-1 to 1-N).

In the mobile station (1-1 to 1-N), when MCS (Modulation and Coding Scheme) approaches a maximum value, huge amounts of downstream data are generated to increase an amount of processing necessary for decode processing and packet processing. Therefore, high processing capability is required for the packet buffer 16 and CPU 17.

Recently communication methods (such as USB, BLUETOOTH, WLAN, and communication between CPUs) except for the wireless communication are mounted on the mobile station (1-1 to 1-N) with an extension of functionality of the mobile station (1-1 to 1-N), and the increase in processing capacity becomes unavoidable in the packet buffer 16 in the future.

Additionally, the increase in processing capacity also becomes unavoidable in the CPU 17 with the progress of the complicated and sophisticated application processing computation.

The state in which various kinds of communication and various applications are competitively operated is also increasing due to multi-task processing and multi-job processing. Therefore, in order to guarantee all the competitive operations, it is necessary that the packet buffer 16 and CPU 17 have extremely high performance.

For example, Patent Document 1 which was filed in advance of the present invention discloses a channel system which includes a common interface used to perform data transfer between an upper hierarchical device and a peripheral control device and a channel control device and a peripheral control device which are connected through the common interface. The channel control device includes a data buffer in which transferred data is tentatively stored, an overrun detection circuit which detects overrun, in which the data transfer cannot be performed when the amount of data stored in the data buffer exceeds storage capacity or when data stored in the data buffer does not exist, a first transfer mode register which determines a data transfer rate, a first transfer mode control circuit which changes a data transfer rate to the data transfer rate determined by the first transfer mode register when the overrun detection circuit detects the overrun, and a first common interface control circuit which controls the common interface to a predetermined transfer rate by a command of the first transfer mode control circuit. The peripheral control device includes a second transfer mode register which determines the data transfer rate, a second transfer mode control circuit which changes a data transfer rate to the data transfer rate determined by the second transfer mode register when the overrun detection circuit detects the overrun, and a second common interface control circuit which controls the common interface to a predetermined transfer rate by a command of the second transfer mode control circuit. The channel system prevents second generation of overrun in a retrial after the overrun is generated.

For example, Patent Document 2 discloses wireless communication system in which a transmission device retransmits plural carrier waves in response to a retransmission request from a reception device. The transmission device transmits the plural carrier waves while transmission data is mapped, and frequencies are changed according to a predetermined frequency hopping pattern in the plural carrier waves. The reception device receives the plural carrier waves. The reception device notifies the transmission device of the interference carrier wave in the received plural carrier waves. The transmission device retransmits transmission data mapped in the interference carrier wave as a priority in order to enhance a data retransmission processing effect to improve reception performance on the reception side.

Patent Document 1: Japanese Patent Publication Laid-Open No. 5-20247

Patent Document 2: Japanese Patent Publication Laid-Open No. 2004-266739

DISCLOSURE OF THE INVENTION

Problem to be Solved by the Invention

Patent Document 1 discloses the technique of controlling the transfer rate during the generation of the overrun to prevent the generation of the overrun. However, Patent Document 1 does not describe restriction of an upper limit of the transmission rate according to the processing capacity in processing the packet data received from the base station.

Patent Document 2 discloses the technique in which the transmission device is notified of the interference carrier wave in the plural carrier waves received from the transmission device side and the transmission device retransmits the transmission data mapped in the interference carrier wave as a priority in order to enhance a data retransmission processing effect. However, Patent Document 2 does not describe the restriction of the upper limit of the transmission rate according to the processing capacity in processing the packet data received from the base station.

In view of the foregoing, an object of the invention is to provide a mobile station, a downstream transmission rate control method, and a downstream transmission rate control program which can restrict the upper limit of the transmission rate according to the processing capacity in processing the packet data received from the base station.

Means for Solving the Problems

The present invention has the following features in order to achieve the object.

In accordance with the invention, a mobile station includes packet data retaining means for tentatively retaining packet data received from a base station; reject ratio computation means for computing a ratio of rejected packet data in the packet data retained by the packet data retaining means; transmission rate setting means for setting an upper limit of a downstream transmission rate based on the ratio computed by the reject ratio computation means; and transmission rate notification means for notifying the base station of the upper limit of the transmission rate set by the transmission rate setting means.

The mobile station according to the invention includes a management table in which a packet data rate retainable by the packet data retaining means and an upper limit of a transmission rate corresponding to the packet data rate are managed while correlated with each other, wherein the transmission rate setting means computes the packet data rate retainable by the packet data retaining means based on the ratio computed by the reject ratio computation means, refers to the management table to obtain the upper limit of the transmission rate correlated with the packet data rate based on the computed packet data rate, and sets the upper limit of the transmission rate.

The mobile station according to the invention includes BER measuring means for measuring BER (Block Error Rate); upper limit determination means for determining an upper limit of a transmission rate based on BER measured by the BER measuring means; and packet data rate obtaining means for referring to the management table to obtain a packet data rate correlated with the upper limit of the transmission rate based on the upper limit of the transmission rate determined by the upper limit determination means, wherein the transmission rate setting means computes a packet data rate retainable by the packet data retaining means by multiplying the packet data rate obtained by the packet data rate obtaining means by the ratio computed by the reject ratio computation means.

The mobile station according to the invention includes retransmission request means for transmitting a retransmission request of packet data rejected in the packet data retained by the packet data retaining means to the base station.

The mobile station according to the invention includes operating state monitoring means for monitoring an operating state of the mobile station, wherein the transmission rate setting means sets an upper limit of a downstream transmission rate based on the operating state monitored by the operating state monitoring means.

The mobile station according to the invention comprising a management table in which the operating state and an upper limit of a transmission rate corresponding to the operating state are managed while correlated with each other, wherein the transmission rate setting means refers to the management table to obtain an upper limit of the transmission rate correlated with the operating state based on the operating state monitored by the operating state monitoring means, and sets the upper limit of the transmission rate.

In the mobile station according to the invention, the operating state of the mobile station is a load condition in a control unit which controls the mobile station.

In the mobile station according to the invention, the operating state of the mobile station is an operating state of an application executed by the mobile station.

In the mobile station according to the invention, the upper limit of the downstream transmission rate is a maximum CQI (Channel Quality Indicator) value.

In accordance with the invention, a downstream transmission rate control method performed by a mobile station including packet data retaining means for tentatively retaining packet data received from a base station, wherein the mobile station performs a reject ratio computation process for computing a ratio of rejected packet data in the packet data retained by the packet data retaining means; a transmission rate setting process for setting an upper limit of a downstream transmission rate based on the ratio computed by the reject ratio computation process; and a transmission rate notification process for notifying the base station of the upper limit of the transmission rate set by the transmission rate setting process.

In the downstream transmission rate control method according to the invention, the mobile station includes a management table in which a packet data rate retainable by the packet data retaining means and an upper limit of a transmission rate corresponding to the packet data rate are managed while correlated with each other, and in the transmission rate setting process, the packet data rate retainable by the packet data retaining means is computed based on the ratio computed by the reject ratio computation process, the management table is referred to obtain the upper limit of the transmission rate correlated with the packet data rate based on the computed packet data rate, and the upper limit of the transmission rate is set.

In the downstream transmission rate control method according to the invention, the mobile station performs a BER measuring process for measuring BER (Block Error Rate); an upper limit determination process for determining an upper limit of a transmission rate based on BER measured by the BER measuring process; and a packet data rate obtaining process for referring to the management table to obtain a packet data rate correlated with the upper limit of the transmission rate based on the upper limit of the transmission rate determined by the upper limit determination process, and in the transmission rate setting process, a packet data rate retainable by the packet data retaining means is computed by multiplying the packet data rate obtained by the packet data rate obtaining process by the ratio computed by the reject ratio computation process.

In the downstream transmission rate control method according to the invention, the mobile station performs a retransmission request process for transmitting a retransmission request of packet data rejected in the packet data retained by the packet data retaining means to the base station.

In the downstream transmission rate control method according to the invention, the mobile station performs an operating state monitoring process for monitoring an operating state of the mobile station, and in the transmission rate setting process, an upper limit of a downstream transmission rate is set based on the operating state monitored by the operating state monitoring process.

In the downstream transmission rate control method according to the invention, the mobile station includes a management table in which the operating state and an upper limit of a transmission rate corresponding to the operating state are managed while correlated with each other, and in the transmission rate setting process, the management table is referred to obtain an upper limit of the transmission rate correlated with the operating state based on the operating state monitored by the operating state monitoring process, and the upper limit of the transmission rate is set.

In the downstream transmission rate control method according to the invention, the operating state of the mobile station is a load condition in a control unit which controls the mobile station.

In the downstream transmission rate control method according to the invention, the operating state of the mobile station is an operating state of an application executed by the mobile station.

In the downstream transmission rate control method according to the invention, the upper limit of the downstream transmission rate is a maximum CQI (Channel Quality Indicator) value.

In accordance with the invention, a downstream transmission rate control program performed by a mobile station including packet data retaining means for tentatively retaining packet data received from a base station, wherein the mobile station performs reject ratio computation processing for computing a ratio of rejected packet data in the packet data retained by the packet data retaining means; transmission rate setting processing for setting an upper limit of a downstream transmission rate based on the ratio computed by the reject ratio computation processing; and transmission rate notification processing for notifying the base station of the upper limit of the transmission rate set by the transmission rate setting processing.

In the downstream transmission rate control program according to the invention, the mobile station includes a management table in which a packet data rate retainable by the packet data retaining means and an upper limit of a transmission rate corresponding to the packet data rate are managed while correlated with each other, and in the transmission rate setting processing, the packet data rate retainable by the packet data retaining means is computed based on the ratio computed by the reject ratio computation processing, the management table is referred to obtain the upper limit of the transmission rate correlated with the packet data rate based on the computed packet data rate, and the upper limit of the transmission rate is set.

In the downstream transmission rate control program according to the invention, the mobile station performs BER measuring processing for measuring BER (Block Error Rate); upper limit determination processing for determining an upper limit of a transmission rate based on BER measured by the BER measuring process; and packet data rate obtaining processing for referring to the management table to obtain a packet data rate correlated with the upper limit of the transmission rate based on the upper limit of the transmission rate determined by the upper limit determination processing, and in the transmission rate setting processing, a packet data rate retainable by the packet data retaining means is computed by multiplying the packet data rate obtained by the packet data rate obtaining processing by the ratio computed by the reject ratio computation processing.

In the downstream transmission rate control program according to the invention, the mobile station performs retransmission request processing for transmitting a retransmission request of packet data rejected in the packet data retained by the packet data retaining means to the base station.

In the downstream transmission rate control program according to the invention, the mobile station performs operating state monitoring processing for monitoring an operating state of the mobile station, and in the transmission rate setting processing, an upper limit of a downstream transmission rate is set based on the operating state monitored by the operating state monitoring processing.

In the downstream transmission rate control program according to the invention, the mobile station includes a management table in which the operating state and an upper limit of a transmission rate corresponding to the operating state are managed while correlated with each other, and in the transmission rate setting processing, the management table is referred to obtain an upper limit of the transmission rate correlated with the operating state based on the operating state monitored by the operating state monitoring processing, and the upper limit of the transmission rate is set.

In the downstream transmission rate control program according to the invention, the operating state of the mobile station is a load condition in a control unit which controls the mobile station.

In the downstream transmission rate control program according to the invention, the operating state of the mobile station is an operating state of an application executed by the mobile station.

In the downstream transmission rate control program according to the invention, the upper limit of the downstream transmission rate is a maximum CQI (Channel Quality Indicator) value.

Advantage of the Invention

In the mobile station, downstream transmission rate control method, and downstream transmission rate control program according to the invention, the mobile station including the packet data retaining means tentatively retaining the packet data received from the base station computes the ratio of the rejected packet data in the packet data retained by the packet data retaining means, sets the upper limit of the downstream transmission rate based on the computed ratio, and notifies the base station of the upper limit of the set transmission rate. Therefore, the upper limit of a transmission rate can be restricted according to the processing capacity in processing the packet data received from the base station.

BEST MODE FOR CARRYING OUT THE INVENTION

A mobile station according to an exemplary embodiment of the invention will be described with reference to FIG. 3.

Figure 3:
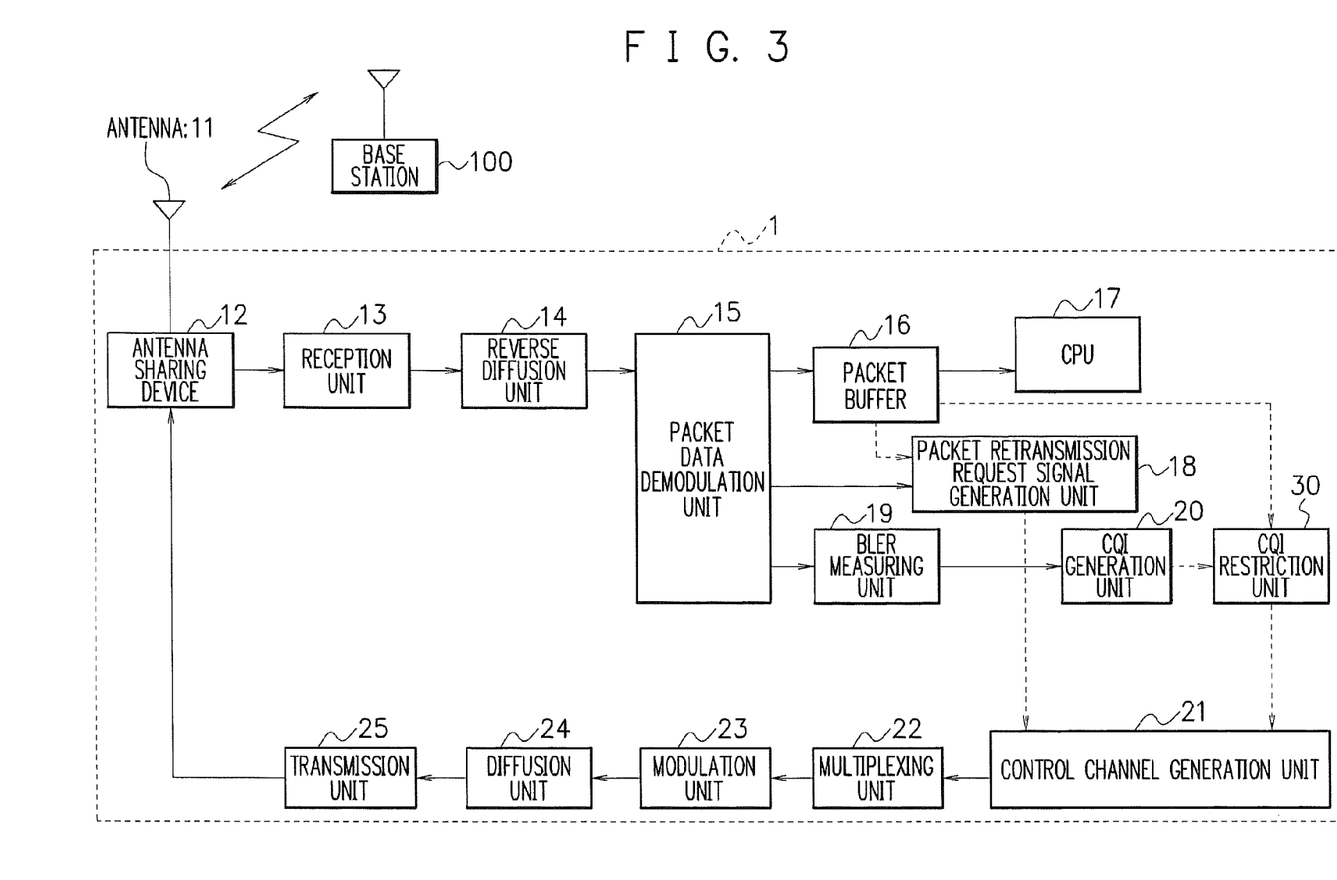
FIG. 3 shows an internal configuration of a mobile station 1 according to a first exemplary embodiment of the invention.

As shown in FIG. 3, the mobile station of the embodiment includes packet data retaining means "corresponding to a reception unit 13, a reverse diffusion unit 14, a packet data demodulation unit 15, a packet buffer 16" for tentatively retaining packet data received from a base station 100, reject ratio computation means "corresponding to the packet buffer 16" for computing a ratio of rejected packet data in the packet data retained by the packet data retaining means 16, transmission rate setting means "corresponding to a CQI restriction unit 30" for setting an upper limit of a downstream transmission rate based on the ratio computed by the reject ratio computation means 16, and transmission rate notification means "corresponding to a control channel generation unit 21, multiplexing unit 22, a modulation unit 23, a diffusion unit 24, and a transmission unit 25" for notifying the base station 100 of the upper limit of the transmission rate set by the transmission rate setting means 30. Therefore, the upper limit of the transmission rate can be restricted according to the processing capacity in processing the packet data received from the base station 100. The mobile station of the embodiment will be described below with reference to the drawings.

First Exemplary Embodiment

A configuration of a mobile station 1 according to a first exemplary embodiment of the invention will be described with reference to FIG. 3.

The mobile station 1 of the first exemplary embodiment includes an antenna 11, an antenna sharing device 12, the reception unit 13, the reverse diffusion unit 14, the packet data demodulation unit 15, the packet buffer 16, the CPU 17, a packet retransmission request signal generation unit 18, a BLER (Block Error Rate) measuring unit 19, a CQI (Channel Quality Indicator) generation unit 20, a control channel generation unit 21, a multiplexing unit 22, a modulation unit 23, a diffusion unit 24, a transmission unit 25 and the CQI restriction unit 30. The mobile station 1 of the first exemplary embodiment is characterized by newly mounting the CQI restriction unit 30 for restricting a maximum CQI (Channel Quality Indicator) value which is an index of a downstream line propagation path state. A processing operation in the mobile station 1 of the first exemplary embodiment will be described.

The packet buffer 16 outputs packet identification information to the packet retransmission request signal generation unit 18. The packet identification information is used to identify the packet data which becomes overflow in the packet buffer 16.

The packet retransmission request signal generation unit 18 generates packet retransmission request control data based on the packet identification information input from the packet buffer 16, and the packet retransmission request signal generation unit 18 outputs the generated packet retransmission request control data to the control channel generation unit 21. The packet retransmission request control data means control data for requesting a packet data retransmission to the base station 100. This enables the mobile station 1 to re-obtain the packet data which becomes overflow in the packet buffer 16 from the base station 100.

The packet buffer 16 also computes a ratio (n/N) and outputs the computed ratio to the CQI restriction unit 30. The ratio (n/N) is a ratio of the number of packets n which do not become the overflow to the overall number of packets N received by the packet buffer 16.

The CQI generation unit 20 compares a BER value input from the BLER measuring unit 19 and a predetermined reference value p. When the CQI generation unit 20 determines that the BER value input from the BLER measuring unit 19 is lower than the reference value p (BER value<P), the CQI generation unit 20 sets a CQI value to a level higher than that of the currently-set CQI value, and the CQI generation unit 20 outputs the set CQI value to the CQI restriction unit 30. When the CQI generation unit 20 determines that the BER value input from the BLER measuring unit 19 is not lower than the reference value p (BER value≧P), the CQI generation unit 20 sets the CQI value to a level lower than that of the currently-set CQI value, and the CQI generation unit 20 outputs the set CQI value to the CQI restriction unit 30.

The CQI restriction unit 30 computes a packet data rate at which the packet buffer 16 can perform buffering based on the ratio input from the packet buffer 16 and the CQI value from the CQI generation unit 20.

Figure 4:
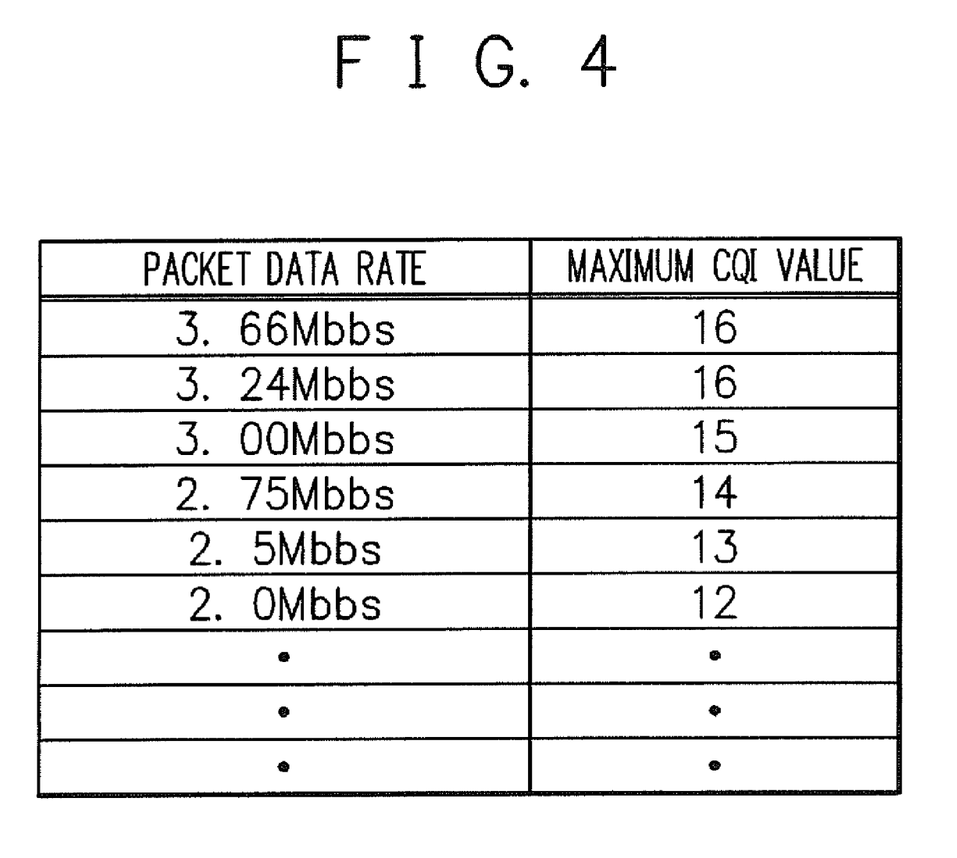
FIG. 4 shows a table configuration of a management table managed by the mobile station 1 of the first exemplary embodiment.

On the basis of the CQI value input from the CQI generation unit 20, the CQI restriction unit 30 refers to a management table of FIG. 4 to obtain a downstream packet data rate correlated with the CQI value input from the CQI generation unit 20. Then, the CQI restriction unit 30 computes the packet data rate at which the packet buffer 16 can perform buffering by multiplying the downstream packet data rate obtained from the management table by the ratio input from the packet buffer 16. A packet data rate A at which the packet buffer 16 can perform buffering is computed by the following equation (1).

$$A = B \times \alpha \quad (1)$$

where A: packet data rate at which the buffering can be performed

B: downstream packet data rate obtained from the management table of FIG. 4

α: a ratio input from the packet buffer 16

Then, on the basis of the packet data rate A at which the buffering can be performed, computed by the equation (1), the CQI restriction unit 30 refers to the management table of FIG. 4 to search and obtain the maximum CQI value which does not exceed the packet data rate A at which the buffering can be performed, computed by the equation (1). The CQI restriction unit 30 outputs the searched and obtained maximum CQI value to the control channel generation unit 21.

For example, it is assumed that "15" is the CQI value input from the CQI generation unit 20. It is also assumed that "0.8" is the ratio input from the packet buffer 16. In this case, the CQI restriction unit 30 refers to the management table of FIG. 4 to obtain the downstream packet data rate of "3.00 Mbps" correlated with the CQI value of "15". Then, the CQI restriction unit 30 multiplies the obtained downstream packet data rate of "3.00 Mbps" by the ratio of "0.8" input from the packet buffer 16 to compute the packet data rate A at which the packet buffer 16 can perform buffering: A="3.00 Mbps× 0.8"="2.40 Mbps".

Then, on the basis of the computed packet data rate of "2.40 Mbps" at which the packet buffer 16 can perform buffering, the CQI restriction unit 30 refers to the management table of FIG. 4 to search and obtain the maximum CQI value of "12" which does not exceed the packet data rate of "2.40 Mbps" at which the buffering can be performed. Therefore, the maximum CQI value can be restricted according to the processing capacity in processing the packet data received from the base station 100.

The CQI restriction unit 30 retains the searched and obtained maximum CQI value for an arbitrary period, and the CQI restriction unit 30 can control so as to lift the restriction of the maximum CQI value when the overflow is not generated in the packet buffer 16 during the arbitrary period. Alternatively, the CQI restriction unit 30 retains the searched and obtained maximum CQI value for an arbitrary period, and the CQI restriction unit 30 can control so as to increase the maximum CQI value in stages when the overflow is not generated in the packet buffer 16 during the arbitrary period.

The control channel generation unit 21 generates a control channel by multiplexing the packet retransmission request control data input from the packet retransmission request signal generation unit 18, the maximum CQI value input from the CQI restriction unit 30, and other pieces of control data. Then, the control channel generation unit 21 outputs the generated control channel to the multiplexing unit 22.

Thus, in the mobile station 1 of the first exemplary embodiment, the ratio of the packet data which does not become the overflow in the packet buffer 16 is computed, the packet data rate at which the packet buffer 16 can perform the buffering is computed based on the computed ratio, the management table of FIG. 4 is referred to search and obtain the maximum CQI value which does not exceed the packet data rate at which the packet buffer 16 can perform the buffering based on the computed packet data rate, and the downstream transmission rate is determined. This enables the downstream transmission rate to be restricted to one at which the overflow is not generated in the packet buffer 16.

Therefore, the base station 100 can decrease the useless retransmission processing for the specific mobile station 1 to increase the downstream line capacity of the overall wireless communication system. The mobile station 1 can decrease the wasted power consumption for decode processing for decoding the packet data rejected when the overflow is generated in the packet buffer 16, retransmission request processing, decode processing for retransmission data, and processing for MCS (Modulation and Coding Scheme).

In the mobile station 1 of the first exemplary embodiment, it is not necessary to guarantee the operation on the competitive packet operation condition in MCS, so that the processing performed by the packet buffer 16 mounted on the mobile station 1 can be decreased. Therefore, the decrease in current consumption, miniaturization of the mobile station 1, and cost reduction can be realized.

In the mobile station 1 of the first exemplary embodiment, the packet buffer 16 outputs the packet identification information for identifying the packet data which becomes overflow in the packet buffer 16 to the packet retransmission request signal generation unit 18, the control channel generation unit 21 generates the control channel by multiplexing the packet retransmission request control data input from the packet retransmission request signal generation unit 18, the maximum CQI value input from the CQI restriction unit 30, and other pieces of control data, and the control channel generation unit 21 transmits the retransmission request of the packet data which becomes overflow in the packet buffer 16 to the base station 100. Therefore, the mobile station 1 re-obtains the packet data which becomes overflow in the packet buffer 16 from the base station 100, so that the loss of the packet data which becomes overflow in the packet buffer 16 can be prevented.

Second Exemplary Embodiment

Then, a second exemplary embodiment will be described.

A mobile station of the second exemplary embodiment is characterized in that a CPU load condition is monitored to determine the maximum CQI value based on the CPU load condition. The mobile station of the second exemplary embodiment will be described with reference to FIGS. 5 and 6.

A configuration of the mobile station 1 of the second exemplary embodiment will be described with reference to FIG. 5.

The mobile station 1 of the second exemplary embodiment includes the antenna 11, the antenna sharing device 12, the reception unit 13, the reverse diffusion unit 14, the packet data demodulation unit 15, the packet buffer 16, the CPU 17, the packet retransmission request signal generation unit 18, the BLER (Block Error Rate) measuring unit 19, the CQI (Channel Quality Indicator) generation unit 20, the control channel generation unit 21, the multiplexing unit 22, the modulation unit 23, the diffusion unit 24, the transmission unit 25, and the CQI restriction unit 30. The mobile station 1 of the second exemplary embodiment is characterized by including the CQI restriction unit 30 which monitors a load condition in the CPU 17 to restrict the maximum CQI (Channel Quality Indicator) value. A processing operation in the mobile station 1 of the second exemplary embodiment will be described below.

In the mobile station 1 of the second exemplary embodiment, the CPU 17 measures the load condition (load factor) of the CPU 17 itself to transmit the measured load condition (load factor) to the CQI restriction unit 30.

Figure 6:
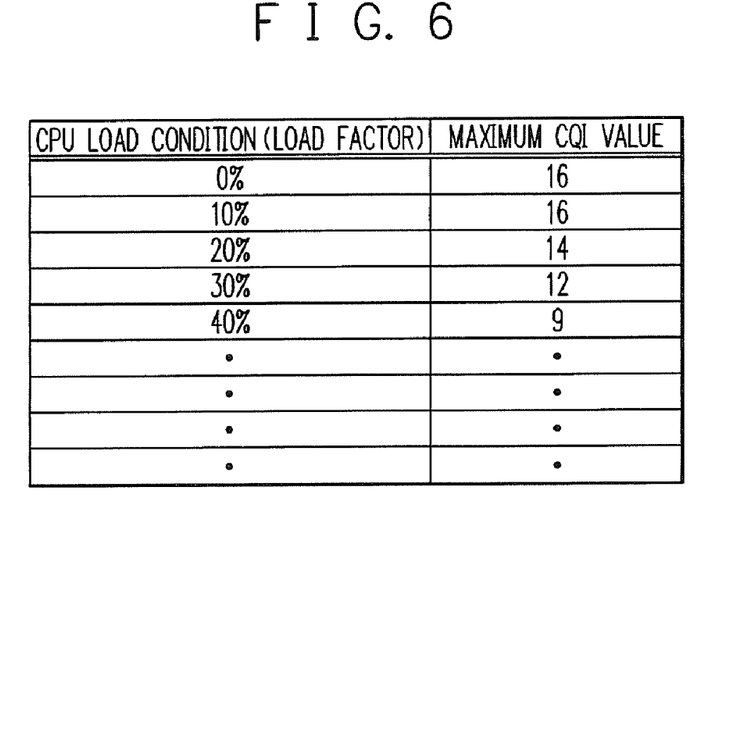
FIG. 6 shows a table configuration of a management table managed by the mobile station 1 of the second exemplary embodiment.

On the basis of the load condition (load factor) input from the CPU 17, the CQI restriction unit 30 refers to a management table of FIG. 6 to search and obtain the maximum CQI value correlated with the load condition (load factor) input from the CPU 17. The CQI restriction unit 30 outputs the searched and obtained maximum CQI restriction value to the control channel generation unit 21.

For example, it is assumed that "20%" is the load condition (load factor) input from the CPU 17. In this case, on the basis of the load condition (load factor) of "20%" input from the CPU 17, the CQI restriction unit 30 refers to the management table of FIG. 6 to search and obtain maximum CQI value of "14" correlated with the load condition (load factor) of "20%". Therefore, the maximum CQI value can be restricted according to the load condition (load factor) in the CPU 17.

The control channel generation unit 21 generates the control channel by multiplexing the packet retransmission request control data input from the packet retransmission request signal generation unit 18, the maximum CQI value input from the CQI restriction unit 30, and other pieces of control data, and the control channel generation unit 21 outputs the generated control channel to the multiplexing unit 22.

Thus, in the mobile station 1 of the second exemplary embodiment, the load condition in the CPU 17 is monitored, and the maximum CQI value is restricted to determine the downstream transmission rate based on the monitored load condition, so that the load condition in the CPU 17 can fix or dynamically restrict the maximum CQI value. Therefore, in the mobile station 1, the load condition in the CPU 17 can arbitrarily be controlled in transmitting the downstream transmission data, and application operation delay caused by the increase in load condition of the CPU 17 and a malfunction such as reset and freeze can be prevented.

In the mobile station 1 of the second exemplary embodiment, it is not necessary to guarantee the operation on the competitive packet operation condition in MCS, so that the processing performed by the CPU 17 mounted on the mobile station 1 can be decreased. Therefore, the decrease in current consumption, the miniaturization of the mobile station 1, and the cost reduction can be realized.

Third Exemplary Embodiment

Then, a third exemplary embodiment will be described.

The mobile station of the third exemplary embodiment is characterized in that the maximum CQI value is determined based on a state of an application running on the CPU 17. The mobile station of the third exemplary embodiment will be described with reference to FIGS. 5 and 7.

Figure 5:
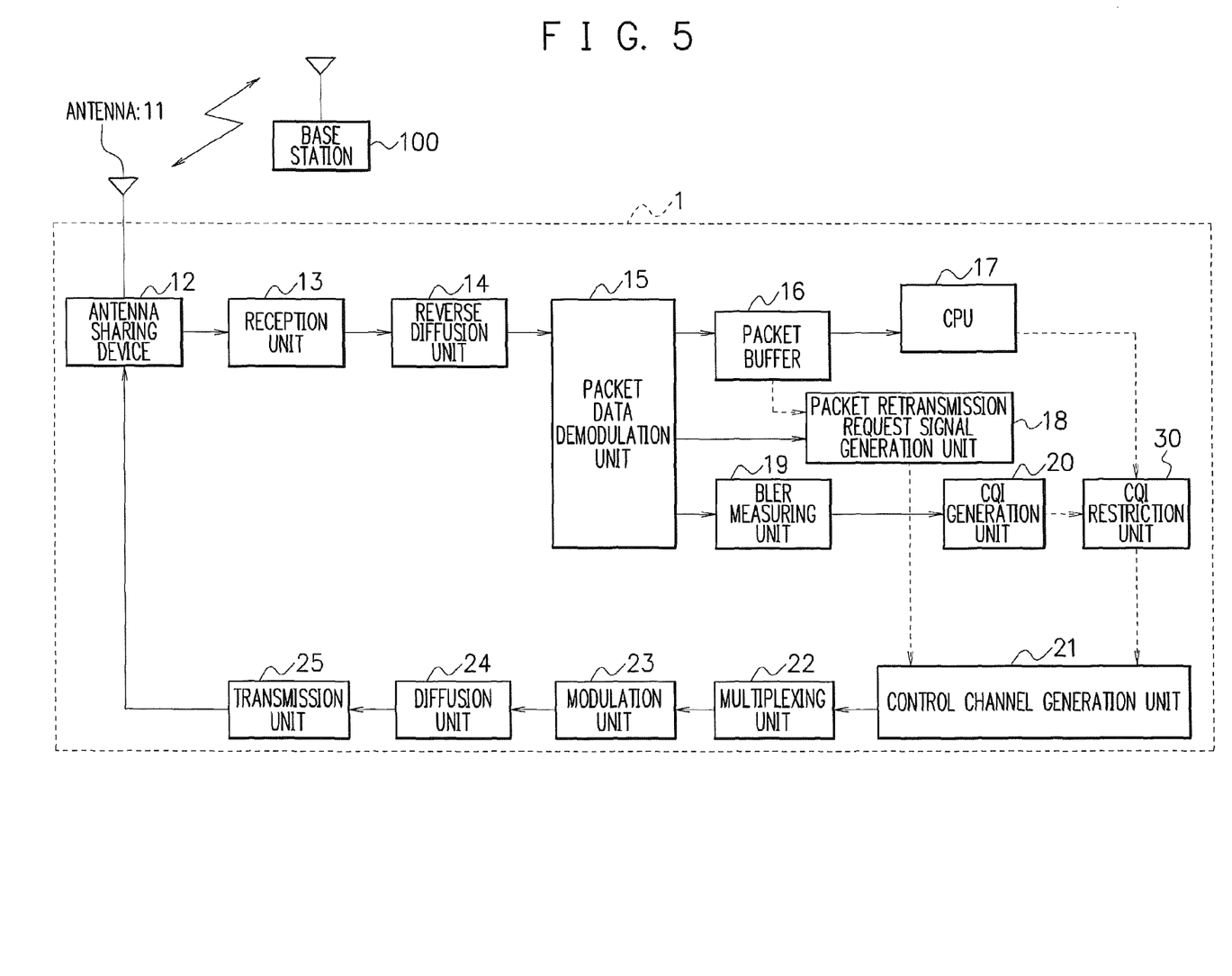
FIG. 5 shows an internal configuration of a mobile station 1 according to a second exemplary embodiment of the invention.

The mobile station 1 of the third exemplary embodiment has the same configuration as the second exemplary embodiment of FIG. 5, and the mobile station 1 is characterized by including the CQI restriction unit 30 which monitors the operation state of the application executed by the CPU 17 to restrict the maximum CQI (Channel Quality Indicator) value. The processing operation in the mobile station 1 of the third exemplary embodiment will be described.

In the mobile station 1 of the third exemplary embodiment, the CPU 17 transmits the operation state of the application executed by the CPU 17 to the CQI restriction unit 30.

Figure 7:
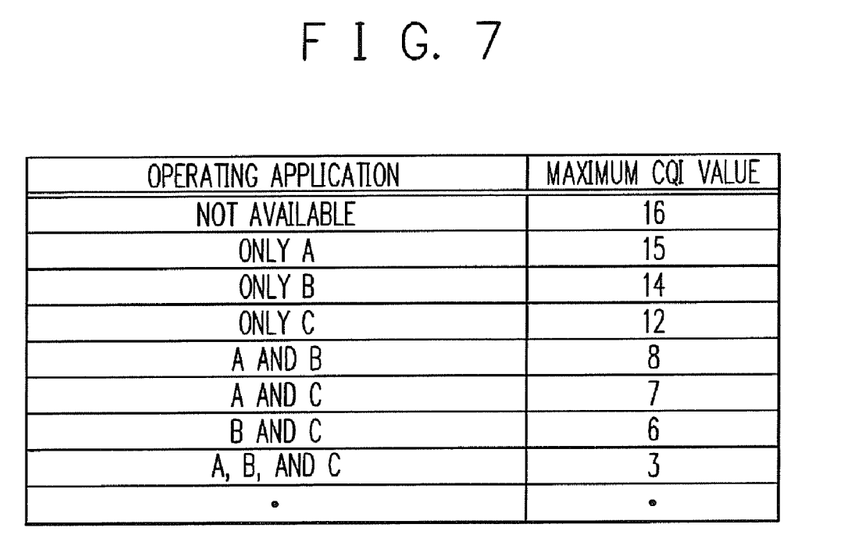
FIG. 7 shows a table configuration of a management table managed by a mobile station 1 according to a third exemplary embodiment of the invention.

On the basis of the operation state of the application input from the CPU 17, the CQI restriction unit 30 refers to a management table of FIG. 7 to search and obtain the maximum CQI value correlated with the application operation state input from the CPU 17. The CQI restriction unit 30 outputs the searched and obtained maximum CQI restriction value to the control channel generation unit 21.

For example, it is assumed that "A and B" is the application operation state input from the CPU 17. In this case, on the basis of the application operation state "A and B" input from the CPU 17, the CQI restriction unit 30 refers to the management table of FIG. 7 to search and obtain the maximum CQI value of "8" correlated with the operation application of "A and B". Therefore, the maximum CQI value can be restricted according to the operation state of the application executed by the CPU 17.

The control channel generation unit 21 generates the control channel by multiplexing the packet retransmission request control data input from the packet retransmission request signal generation unit 18, the maximum CQI value input from the CQI restriction unit 30, and other pieces of control data, and outputs the generated control channel to the multiplexing unit 22.

Thus, in the mobile station 1 of the third exemplary embodiment, the operation state of the application executed by the CPU 17 is monitored, and the maximum CQI value is restricted to determine the downstream transmission rate based on the monitored application operation state, so that the maximum CQI value can be fixed or dynamically restricted according to the operation state of the application executed by the CPU 17. Therefore, in the mobile station 1, the load condition in the CPU 17 can arbitrarily be controlled in transmitting the downstream transmission data, and the application operation delay caused by the increase in load condition of the CPU 17 and the malfunction such as reset and freeze can be prevented.

In the mobile station 1 of the third exemplary embodiment, it is not necessary to guarantee the operation on the competitive packet operation condition in MCS, so that the processing performed by the CPU 17 mounted on the mobile station 1 can be decreased. Therefore, the decrease in current consumption, the miniaturization of the mobile station 1, and the cost reduction can be realized.

Fourth Exemplary Embodiment

Then, a fourth exemplary embodiment will be described.

In the mobile station of the fourth exemplary embodiment is characterized in that the restriction control methods of the maximum CQI value in the first to third exemplary embodiments are arbitrarily combined. The fourth exemplary embodiment will be described with reference to FIG. 8.

Figure 8:
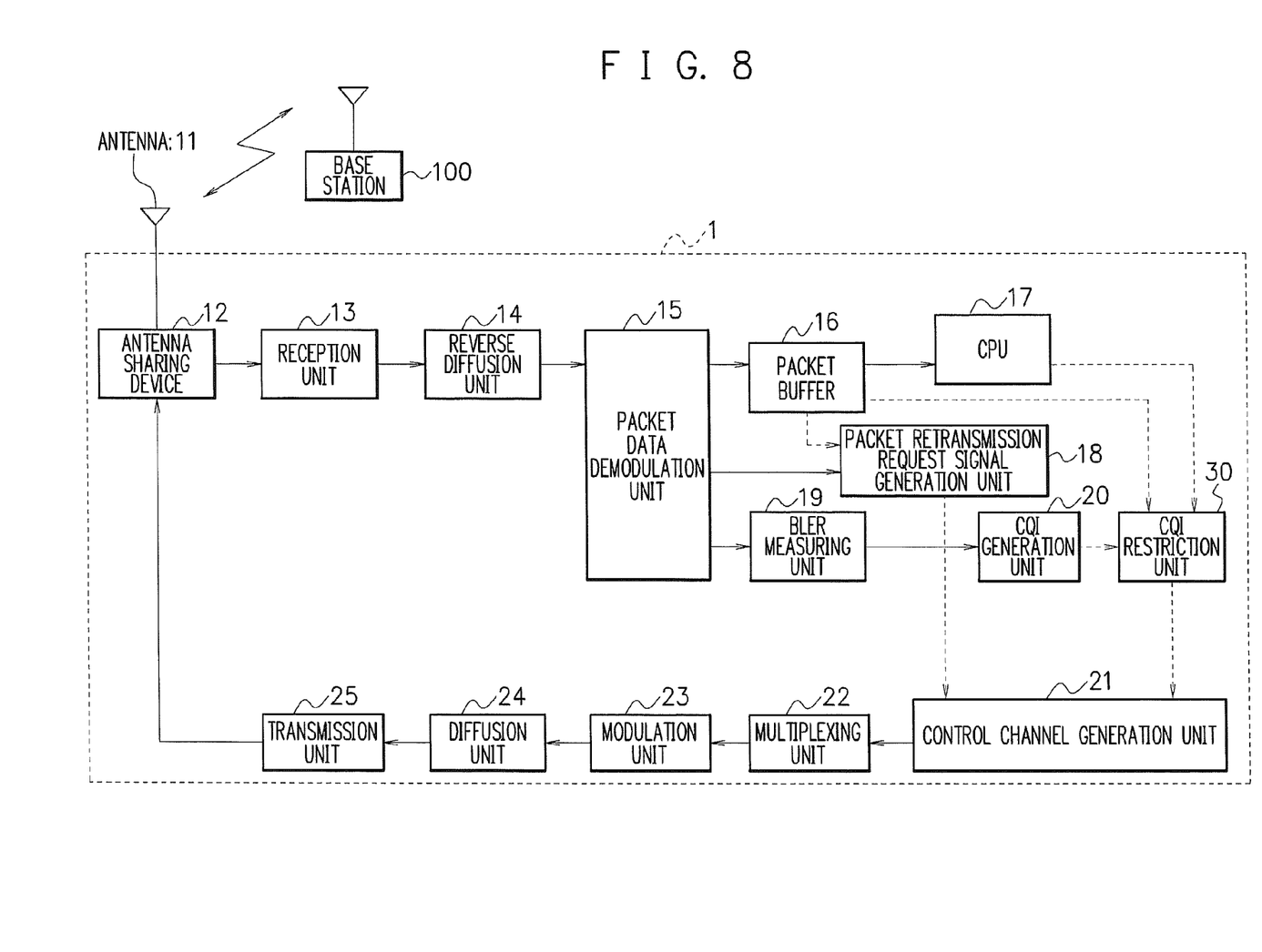
FIG. 8 shows an internal configuration of a mobile station 1 according to a fourth exemplary embodiment of the invention.

As shown in FIG. 8, in the mobile station 1 of the fourth exemplary embodiment, the packet buffer 16 computes the ratio (n/N) of the number of packets n which do not become the overflow to the overall number of packets N received by the packet buffer 16, and the packet buffer 16 outputs the computed ratio to the CQI restriction unit 30.

The CPU 17 measures the load condition (load factor) of the CPU 17 itself, and the CPU 17 transmits the measured load condition (load factor) to the CQI restriction unit 30. The CPU 17 also transmits the operation state of the application executed by the CPU 17 to the CQI restriction unit 30.

Then, the CQI restriction unit 30 determines the maximum CQI value satisfying all the conditions based on at least one of the ratio input from the packet buffer 16, the load condition (load factor) input from the CPU 17, and the application operation state input from the CPU 17. Therefore, the CQI restriction unit 30 stores and manages the three management table shown in FIGS. 4, 6, and 7.

Thus, the mobile station 1 of the fourth exemplary embodiment determines the maximum CQI value based on at least one of the ratio input from the packet buffer 16, the load condition (load factor) input from the CPU 17, and the application operation state input from the CPU 17. This enables the mobile station 1 to restrict the upper limit of the maximum CQI value according to the processing capacity in processing the packet data received from the base station 100.

The preferred embodiments of the invention are described only by way of example. However, the invention is not limited to the above-described embodiments, but various modifications can be made without departing from the scope of the invention. For example, the table configurations of the management table are shown in FIGS. 4, 6, and 7 by way of example, the invention is not limited to the table configurations of FIGS. 4, 6, and 7, but any table configuration can be formed.

The series of processing operations performed in the mobile stations 1 of the exemplary embodiments can be executed by a computer program. Alternatively, the program can be recorded in a recording medium such as an optical recording medium, a magnetic recording medium, a magneto optical recording medium, and a semiconductor device, and the mobile station reads the program from the recording medium, which allows the mobile station 1 to perform the series of processing operations. Alternatively, the mobile station 1 reads the program from an external device connected through a predetermined network, which allows the mobile station 1 to perform the series of processing operations.

INDUSTRIAL APPLICABILITY

The mobile station, downstream transmission rate control method, and downstream transmission rate control program according to the invention can be applied to communication devices such as a portable telephone which conducts downstream high-speed packet communication.

EXPLANATIONS OF LETTERS OR NUMERALS 1-1 to N mobile station
100-1 to N base station
11 antenna
12 antenna sharing device
13 reception unit 14 reverse diffusion unit
15 packet data demodulation unit
16 packet buffer
17 CPU
18 packet retransmission request signal generation unit
19 BLER (Block Error Rate) measuring unit
20 CQI (Channel Quality Indicator) generation unit
21 control channel generation unit
22 multiplexing unit
23 modulation unit
24 diffusion unit
25 transmission unit
30 CQI restriction unit

The invention claimed is:

1. A mobile station comprising:
a packet data retaining unit which tentatively retains packet data received from a base station;
a reject ratio computation unit which computes a ratio of rejected packet data resulting from a processing capacity overflow in the packet data retained by the packet data retaining unit;
a management table in which a packet data rate retainable by the packet data retaining unit and an upper limit of a transmission rate corresponding to the packet data rate are managed while being correlated with one another;
a BER measuring unit which measures BER (Block Error Rate);
an upper limit determination unit which determines an upper limit of a transmission rate based on the BER measured by the BER measuring unit;
a packet data rate obtaining unit which references the management table to obtain a packet data rate correlated with the upper limit of the transmission rate based on the upper limit of the transmission rate determined by the upper limit determination unit;
a transmission rate setting unit which computes a packet data rate retainable by the packet data retaining unit by multiplying the packet data rate obtained by the packet data rate obtaining unit by the ratio computed by the reject ratio computation unit, and which references the management table to obtain the upper limit of the transmission rate correlated with the packet data rate based on the computing packet data rate, and which places a restriction on the upper limit of the transmission rate; and
a transmission rate notification unit which notifies the base station of the upper limit of the transmission rate set by the transmission rate setting unit.

2. The mobile station according to claim 1, comprising a retransmission request unit which transmits a retransmission request of packet data rejected in the packet data retained by the packet data retaining unit to the base station.

3. The mobile station according to claim 1, comprising an operating state monitoring unit which monitors an operating state of the mobile station,
wherein the transmission rate setting unit sets an upper limit of a downstream transmission rate based on the operating state monitored by the operating state monitoring unit.

4. The mobile station according to claim 3, comprising a management table in which the operating state and an upper limit of a transmission rate corresponding to the operating state are managed while correlated with each other,
wherein the transmission rate setting unit refers to the management table to obtain an upper limit of the transmission rate correlated with the operating state based on the operating state monitored by the operating state monitoring unit, and sets the upper limit of the transmission rate.

5. The mobile station according to claim 3, wherein the operating state of the mobile station is a load condition in a control unit which controls the mobile station.

6. The mobile station according to claim 3, wherein the operating state of the mobile station is an operating state of an application executed by the mobile station.

7. The mobile station according to claim 1, wherein the upper limit of the downstream transmission rate is a maximum CQI (Channel Quality Indicator) value.

8. A mobile station comprising:
packet data retaining means for tentatively retaining packet data received from a base station;
reject ratio computation means for computing a ratio of rejected packet data resulting from a processing capacity overflow in the packet data retained by the packet data retaining means;
a management table in which a packet data rate retainable by the packet data retaining unit and an upper limit of a transmission rate corresponding to the packet data rate are managed while being correlated with one another;
BER measuring means for measuring BER (Block Error Rate);
upper limit determination means for determining an upper limit of a transmission rate based on the BER measured by the BER measuring unit;
packet data rate obtaining means for referencing the management table to obtain a packet data rate correlated with the upper limit of the transmission rate based on the upper limit of the transmission rate determined by the upper limit determination means;
transmission rate setting means for computing a packet data rate retainable by the packet data rate retaining unit by multiplying the packet data rate obtained by the packet data rate obtaining unit by the ratio computed by the reject ratio computation unit, and for referencing the management table to obtain the upper limit of the transmission rate correlated with the packet data rate based on the computing packet data rate, and for placing a restriction on the upper limit of the transmission rate; and
transmission rate notification means for notifying the base station of the upper limit of the transmission rate set by the transmission rate setting means.

9. A downstream transmission rate control method performed by a mobile station including a packet data retaining unit which tentatively retains packet data received from a base station, wherein the mobile station performs:
a reject ratio computation process for computing a ratio of rejected packet data resulting from a process capacity overflow in the packet data retained by the packet data retaining unit;
a management process in which a packet data rate retainable by the packet data retaining unit and an upper limit of a transmission rate corresponding to the packet data rate are managed within a management table while being correlated with one another;
a BER measuring process in which BER (Block Error Rate) is measured;
an upper limit determination process in which an upper limit of a transmission rate is determined based on the BER measured;
a packet data rate obtaining process in which the management table is referenced to obtain a packet data rate correlated with the upper limit of the transmission rate based on the upper limit of the transmission rate determined by the upper limit determination process;

a transmission rate setting process for computing a packet data rate retainable by the packet data rate retaining process by multiplying the packet data rate obtained by the packet data rate obtaining process by the ratio computed by the reject ratio computation process, and which references the management table to obtain the upper limit of the transmission rate correlated with the packet data rate based on the computing packet data rate, and which places a restriction on the upper limit of the transmission rate; and a transmission rate notification process for notifying the base station of the upper limit of the transmission rate set by the transmission rate setting process.

10. The downstream transmission rate control method according to claim 9, wherein the mobile station includes a management table in which a packet data rate retainable by the packet data retaining unit and an upper limit of a transmission rate corresponding to the packet data rate are managed while correlated with each other, and in the transmission rate setting process, the packet data rate retainable by the packet data retaining unit is computed based on the ratio computed by the reject ratio computation process, the management table is referred to obtain the upper limit of the transmission rate correlated with the packet data rate based on the computed packet data rate, and the upper limit of the transmission rate is set.

11. The downstream transmission rate control method according to claim 9, wherein the mobile station performs a retransmission request process for transmitting a retransmission request of packet data rejected in the packet data retained by the packet data retaining unit to the base station.

12. The downstream transmission rate control method according to claim 9, wherein the mobile station performs an operating state monitoring process for monitoring an operating state of the mobile station, and in the transmission rate setting process, an upper limit of a downstream transmission rate is set based on the operating state monitored by the operating state monitoring process.

13. The downstream transmission rate control method according to claim 12, wherein the mobile station includes a management table in which the operating state and an upper limit of a transmission rate corresponding to the operating state are managed while correlated with each other, and in the transmission rate setting process, the management table is referred to obtain an upper limit of the transmission rate correlated with the operating state based on the operating state monitored by the operating state monitoring process, and the upper limit of the transmission rate is set.

14. The downstream transmission rate control method according to claim 12, wherein the operating state of the mobile station is a load condition in a control unit which controls the mobile station.

15. The downstream transmission rate control method according to claim 12, wherein the operating state of the mobile station is an operating state of an application executed by the mobile station.

16. The downstream transmission rate control method according to claim 9, wherein the upper limit of the downstream transmission rate is a maximum CQI (Channel Quality Indicator) value.

17. A computer-readable medium storing a downstream transmission rate control program performed by a mobile station including a packet data retaining unit which tentatively retains packet data received from a base station, wherein the mobile station performs:

a reject ratio computation process for computing a ratio of rejected packet data resulting from a process capacity overflow in the packet data retained by the packet data retaining unit;

a management process in which a packet data rate retainable by the packet data retaining unit and an upper limit of a transmission rate corresponding to the packet data rate are managed within a management table while being correlated with one another;

a BER measuring process in which BER (Block Error Rate) is measured;

an upper limit determination process in which an upper limit of a transmission rate is determined based on the BER measured;

a packet data rate obtaining process in which the management table is referenced to obtain a packet data rate correlated with the upper limit of the transmission rate based on the upper limit of the transmission rate determined by the upper limit determination process;

a transmission rate setting process for computing a packet data rate retainable by the packet data rate retaining process by multiplying the packet data rate obtained by the packet data rate obtaining process by the ratio computed by the reject ratio computation process, and which references the management table to obtain the upper limit of the transmission rate correlated with the packet data rate based on the computing packet data rate, and which places a restriction on the upper limit of the transmission rate; and a transmission rate notification process for notifying the base station of the upper limit of the transmission rate set by the transmission rate setting process.

18. The computer-readable medium storing the downstream transmission rate control program according to claim 17, wherein the mobile station performs retransmission request processing for transmitting a retransmission request of packet data rejected in the packet data retained by the packet data retaining unit to the base station.

19. The computer-readable medium storing the downstream transmission rate control program according to claim 17, wherein the mobile station performs operating state monitoring processing for monitoring an operating state of the mobile station, and in the transmission rate setting processing, an upper limit of a downstream transmission rate is set based on the operating state monitored by the operating state monitoring processing.

20. The computer-readable medium storing the downstream transmission rate control program according to claim 19, wherein the mobile station includes a management table in which the operating state and an upper limit of a transmission rate corresponding to the operating state are managed while correlated with each other, and in the transmission rate setting processing, the management table is referred to obtain an upper limit of the transmission rate correlated with the operating state based on the operating state monitored by the operating state monitoring processing, and the upper limit of the transmission rate is set.

21. The computer-readable medium storing the downstream transmission rate control program according to claim 19, wherein the operating state of the mobile station is a load condition in a control unit which controls the mobile station.

22. The computer-readable medium storing the downstream transmission rate control program according to claim 19, wherein the operating state of the mobile station is an operating state of an application executed by the mobile station.

23. The computer-readable medium storing the downstream transmission rate control program according to claim 17, wherein the upper limit of the downstream transmission rate is a maximum CQI (Channel Quality Indicator) value.

* * * * *